United States Patent [19]
Renck

[11] 3,909,326
[45] Sept. 30, 1975

[54] METHOD FOR APPLYING HEAT SEALABLE MEMBRANE

[75] Inventor: Lawrence E. Renck, Rolling Meadows, Ill.

[73] Assignee: Kraftco Corporation, Glenview, Ill.

[22] Filed: Feb. 26, 1973

[21] Appl. No.: 335,947

[52] U.S. Cl. .............................. 156/69; 53/15; 53/39; 156/272
[51] Int. Cl.² ........................................ B29C 27/04
[58] Field of Search ............. 156/69, 272; 53/39, 15

[56] References Cited
UNITED STATES PATENTS

| | | | |
|---|---|---|---|
| 2,620,939 | 12/1952 | Weisgerber | 156/69 X |
| 2,634,012 | 4/1953 | Copeman | 156/69 X |
| 3,383,256 | 5/1968 | Carbone | 156/69 |
| 3,474,952 | 10/1969 | Cover et al. | 156/272 X |
| 3,723,212 | 3/1973 | Casper | 156/69 |
| 3,798,094 | 3/1974 | Costa | 156/69 |

*Primary Examiner*—Edward G. Whitby
*Attorney, Agent, or Firm*—Fitch, Even, Tabin & Luedeka

[57] ABSTRACT

Apparatus is provided for induction heating of a heat sealable packaging material so as to apply the heat sealable packaging material to the mouth of a container. The apparatus generally includes a conveyor for moving the container in proximity to an induction heating coil and further includes a continuous belt which is timed to move in sequence with the container conveyor. The continuous belt moves into position over and presses down upon the heat sealable packaging material while it is in contact with the mouth of the container and as the container and the heat sealable packaging material are passed in proximity to an induction heating coil.

6 Claims, 4 Drawing Figures

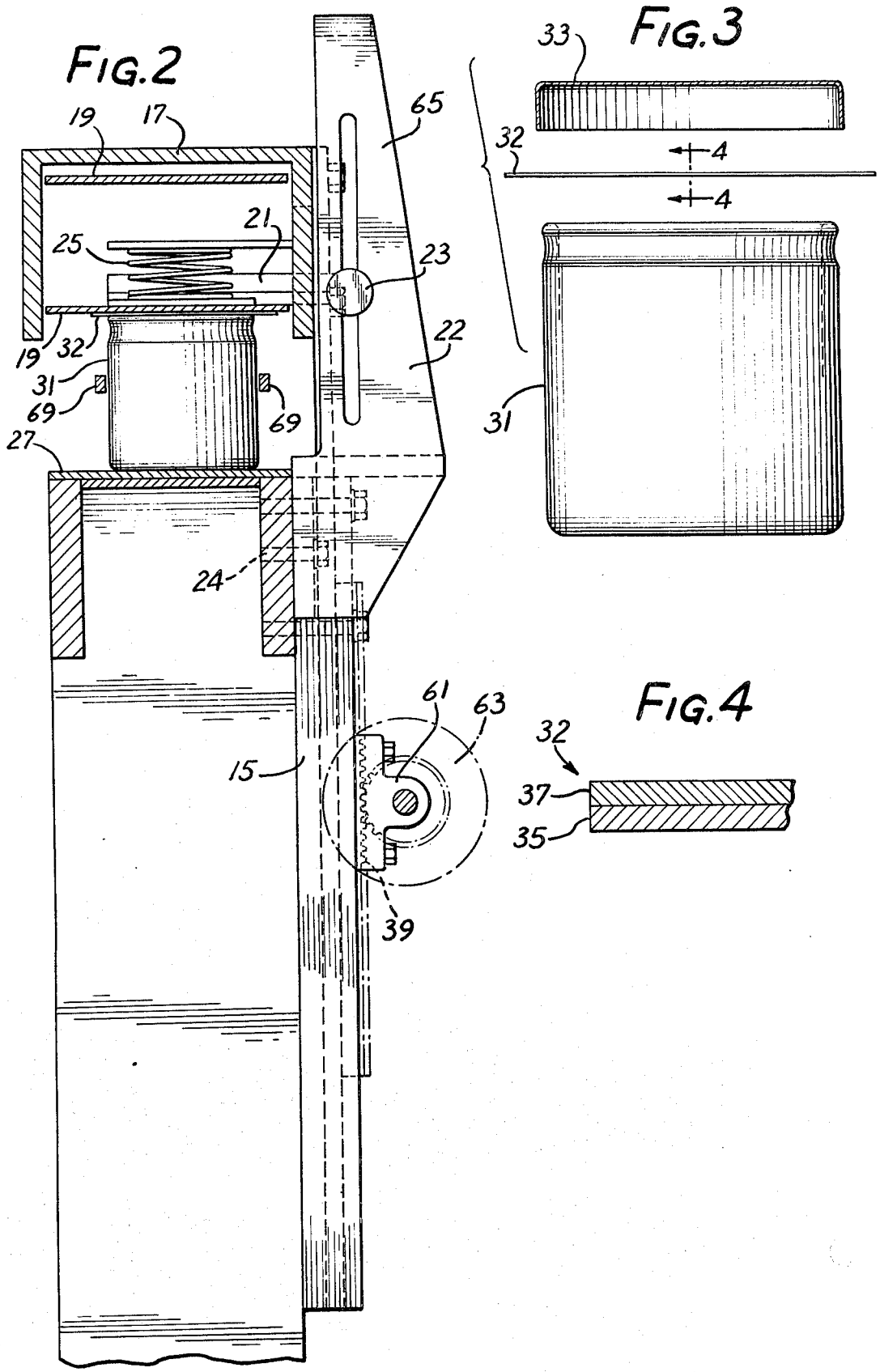
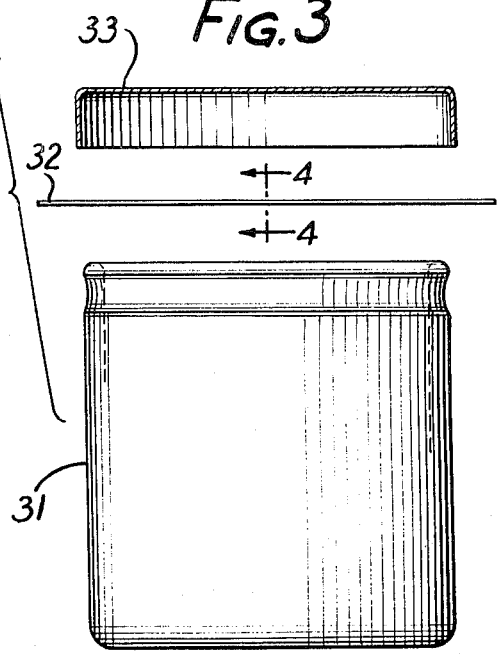
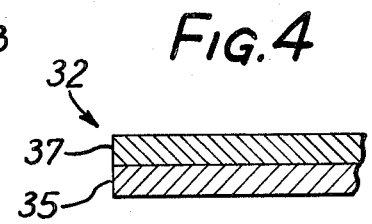

METHOD FOR APPLYING HEAT SEALABLE MEMBRANE

The present invention relates generally to apparatus and a method for applying a heat sealable membrane onto open mouthed containers. More particularly, the present invention is directed to apparatus and a method for applying heat sealable membranes to the mouth of containers by means of induction heating.

The use of containers of glass, metal or plastic to package various products is well known. It is known to provide such containers with a lug or spiral arrangement at the open end of the container by means of which a cap may be screwed onto the container to close the container. The cap is usually provided on its interior surface with a compressible or resilient material by means of which the glass container can be effectively sealed. It is known to provide a sealable membrane over the mouth of the container and interposed between the mouth and the screw cap. Such membranes usually are provided with a peripheral coating of a pressure sensitive adhesive As the screw cap is tightened, pressure is transferred to the membrane to seal the membrane to the mouth of the container. It is also known to provide containers with a snap-on or friction fit closure. The snap-on and friction fit closures are not capable of exerting sufficient pressure to seal pressure sensitive membranes. It would be desirable to provide a method and apparatus for applying heat sealable membranes to open mouth containers. It would be particularly desirable to provide apparatus and a method for applying heat sealable membranes to containers which do not have lugs or threads by which a screw cap can be affixed.

Heat sealable membranes are, of course, activated by the application of heat. A recent development in heating heat sealable membranes to activate the heat sealable membrane and to provide a seal over the mouth of a container is the use of induction heating. In this method of heating, a packaging material including a heat sealable membrane which is in proximity to a metal source is placed over the mouth of the container and the container with the heat sealable membrane in place is positioned in proximity to an induction heating coil. The induction heating coil activates the metal and generates heat which seals the heat sealable membrane to the mouth of the closure.

To effect heat sealing of a heat sealable packaging membrane to a container requires that the heat sealable membrane be maintained in tight contact with the mouth of the container under some pressure as the induction heating coil is energized. This is not difficult to perform when a single jar is sealed by induction heating apparatus. However, it is desirable to provide apparatus and a method for the rapid and continuous sealing of containers by induction heating apparatus as the containers are continuously passed in proximity to the induction heating coil. Accordingly, the present invention is directed to apparatus and a method for continuously applying heat sealable membranes to the mouth of containers as the containers are passed in proximity to an induction heating coil.

The principal object of the present invention is to provide apparatus and a method for applying packaging materials including a heat sealable membrane to the mouth of containers. Another object of the present invention is to provide a method and apparatus for applying a heat sealable packaging material to the mouth of glass jars by means of induction heating apparatus. A further object of the present invention is to provide continuous apparatus for induction heating activation of heat sealable packaging materials.

These and other objects of the present invention will become more apparent from the following detailed description and accompanying drawings wherein;

FIG. 2 is an end view of the apparatus of FIG. 1, partially broken away and partially in section;

FIG. 3 is a view of a glass container showing the relationship of the heat sealable packaging material and an overcap in exploded view, and FIG. 4 is a cross section of the heat sealable coating material of FIG. 3.

Figure 1:
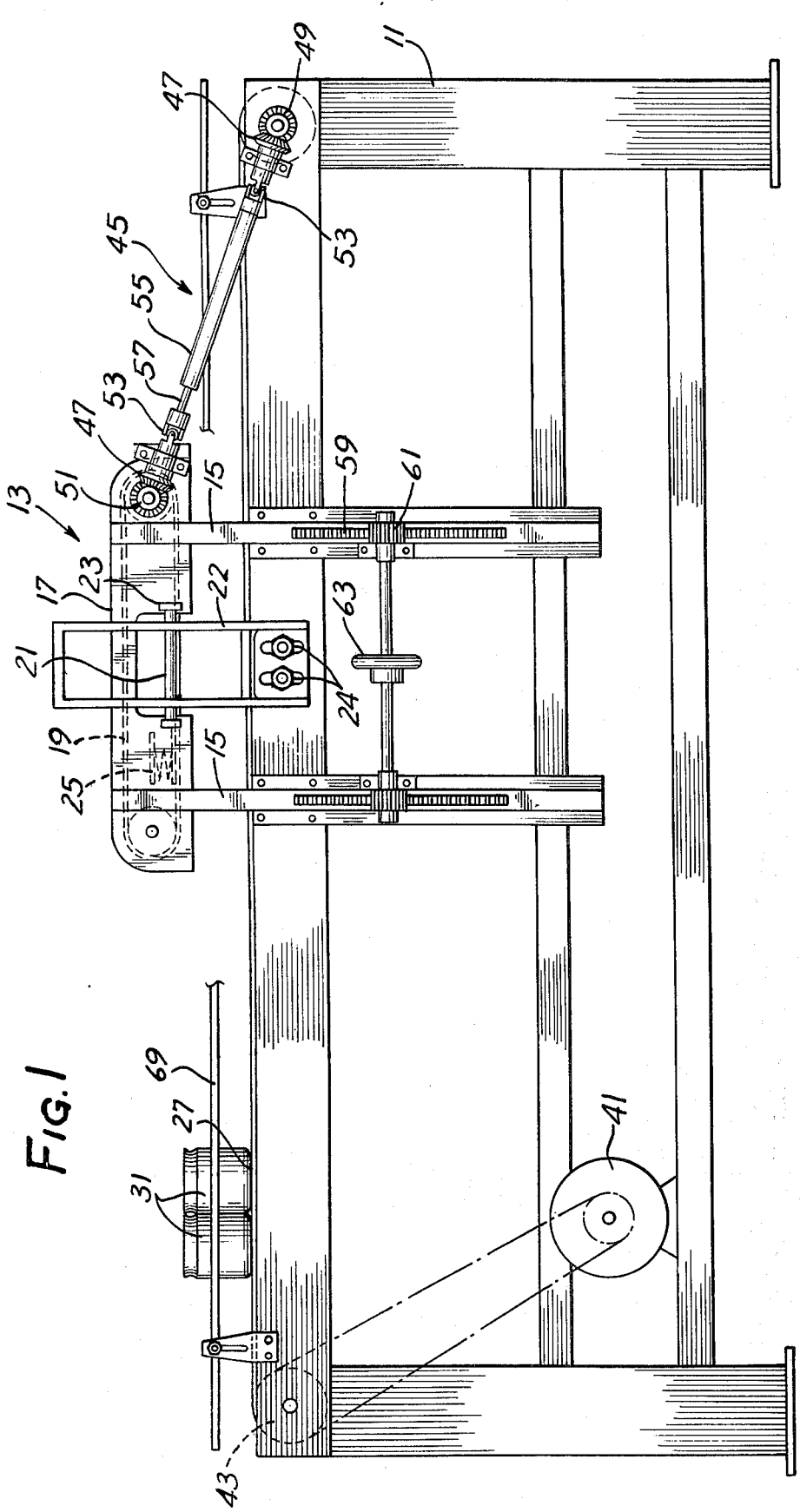
FIG. 1 is a front view of the apparatus of the present invention.

Generally, in accordance with various features of the present invention, apparatus is provided for induction heating of a heat sealable packaging material so as to apply the heat sealable packaging material to the mouth of the container. The heat sealable packaging material may be a single heat sealable membrane or may be a laminated packaging material including a heat sealable membrane. As used herein, the term "heat sealable packaging material" includes single heat sealable membranes as well as multi-ply laminated packaging materials which include a heat sealable membrane. The apparatus generally includes a conveyor for moving the container in proximity to an induction heating coil. The apparatus further includes a continuous belt which is timed to move in sequence with the container conveyor. The continuous belt moves into position over and presses down upon the heat sealable packaging material which is in contact with the mouth of the container as the container and heat sealable packaging material are passed in proximity to an induction heating coil. Thereafter, the container with the heat sealable affixed packaging material in place is moved by the conveyor from the apparatus.

More particularly, referring now to FIG. 1, the apparatus includes a main frame 11 upon which an adjustable frame assembly 13 is mounted. The adjustable frame assembly 13 includes slideable frame members 15 and the shroud 17 which is attached to the adjustable frame members 15 by suitable means. A continuous belt 19 is positioned within the shroud 17. The continuous belt 19 is used to establish pressure upon containers as they are passed beneath induction coil 21, as will be described more fully hereinafter.

Induction coil 21 is located within shroud 17 and is adjustably mounted upon bracket 22. The induction coil is adjustably mounted so that it may be positioned as desired to attain a proper relation between induction coil 21 and the containers passing beneath induction coil 21. Bracket 22 is attached to the main frame 11 by means of suitable fasteners, such as bolts 24. The induction coil 21 is adjusted by loosening nut 23 and moving the induction coil to the position desired and thereafter tightening nut 23. Spring 25 is optionally provided to further aid in developing pressure upon a container.

Conveyor belt 27 is used to convey containers 31 beneath induction coil 17. As can best be seen in FIG. 3, a heat sealable packaging material 32 is placed over the mouth of container 31 prior to moving container 31 into position under induction coil 21. An overcap 33 may be placed in position after the packaging material is placed in position. The use of an overcap 33 is, however, not necessary. Also, the use of a snap-on or friction fit overcap 33 does not provide sufficient pressure to effect a seal between heat sealable member 32 and container 31 upon activation of induction coil 21. The use of continuous belt 19 is necessary to establish the desired pressure to permit a seal to be effected between the heat sealable member 32 and container 31. The use of continuous belt 19 is necessary to establish the desired pressure to permit a seal to be effected between the heat sealable member 32 and container 31. In another embodiment of the invention, the heat sealable packaging material may be placed within the overcap prior to affixing the overcap to the container.

As can best be seen in FIG. 4, the heat sealable packaging material 32 is preferably a laminate of at least two materials. There may be other materials in the laminate but, preferably, at least one of the materials is a metal foil which may be activated by induction coil 21 to effect a seal in accordance with the method and apparatus of the present invention. It should be understood, however, that the apparatus of the invention may be used to effect sealing of glass, metal or plastic containers. Also, plastic, paper or metal overcaps may be used. When the container or the overcap is metal, it is not necessary to provide a metal foil laminate in the heat sealable packaging material.

Heat sealable packaging material 32 preferably includes at least a heat sealable membrane 35 and a metal foil 37. When brought into proximity with induction coil 21, the induction coil causes the metal foil layer 37 to be heated and this in turn activates the heat sealable membrane 35 so as to cause the heat sealable layer 35 to adhere to the mouth of container 31. Any suitable heat sealable membrane, or heat sealable material, such as polyethylene, copolymers or ethylene chloride and vinyl acetate, polypropylene, polyesters, waxes and the like may be used.

Conveyor 27 is driven by means of motor 41. Motor 41 is preferably a variable speed motor and may be directly coupled to drive sprocket 43 to drive conveyor 27. Any suitable drive system may be used to drive continuous belt 19 in timed relation to conveyor 27. As shown in FIG. 1, continuous belt 19 is driven by means of the drive assembly 45. Drive assembly 45 includes level gears 47 which are coupled to sprocket 49 of conveyor belt 27 at one end and are coupled to drive sprocket 51 for driving continuous belt 19. The connecting members between drive sprocket 49 and drive sprocket 47 include universal joints 53 and a hollow keyed shaft 55 which is engaged by splined shaft 57. The drive assembly 45 permits direct coupling of the conveyor belt 27 and continuous belt 19 so that the belts may be driven at the same speed by a simple arrangement.

Adjustable frame members 15 may be adjusted in a vertical direction by means of rack 59 and pinion gear 61. Adjusting wheel 63 is turned in either direction so as to raise or lower the adjustable frame 15. This permits raising and lowering of continuous belt 19 to permit using the apparatus for different sized containers. Other suitable means for raising and lowering the containers may be used, such as a hydraulic cylinder of lever arm arrangement.

In operation, suitable apparatus (not shown) is used to position a heat sealable packaging material 32 into position over the mouth of a container 31. Preferably an overcap 33 is also placed over container 31 so as to restrain heat sealable member 32 and prevent its movement during movement of the container through the apparatus of the invention. The container with the heat sealable packaging material 32 in place is then moved onto conveyor 27. Guide bars 69 restrain containers 31 and prevent them from being lost from the conveyor 27. Conveyor 27 passes the containers into position under continuous belt 19. Continuous belt 19 is controlled to move at the same speed as conveyor 27 so that there is no differential motion between continuous belt 19 and conveyor 27. The continuous belt 19 presses down upon the mouth of the container 31 and holds the heat sealable packaging material 32 tightly in position as the container is passed under the induction coil 19. Induction coil 19 is energized with sufficient power to heat the metal foil laminate of heat sealable member 32 and to cause the metal foil laminate to attain a sufficient temperature to activate the heat sealing membrane 35 of heat sealable packaging material 32. For some sizes of jars it may be desirable to establish additional pressure on the container as it passes beneath induction coil 21 and a spring 25 or other suitable pressure increasing means may be used to increase the pressure as the container 31 is passed beneath induction coil 21.

After passing through the apparatus, the containers, which are now provided with a sealed cover over the mouth of the container, are transferred from conveyor 27 to further packaging or other handling equipment.

What is claimed is:

1. A continuous method for applying and sealing a heat sealable packaging material to the mouth of a container consisting essentially of the steps of continuously transporting an open mouth container along a conveyor, placing a heat sealable packaging material in contact with said mouth of said container, engaging said heat sealable packaging material with a moving surface spaced from said conveyor, moving parallel to said conveyor in the same direction and at the same speed as said conveyor so as to press said packaging material against said mouth of said container with sufficient pressure to seal said packaging material to said mouth of said container when said container with said packaging material in contact with said mouth is continuously passed in proximity to induction heating means.

2. A method in accordance with claim 1 wherein said engaging of said heat sealable packaging material is effected by use of a continuous belt which is spaced from and moves parallel to said conveyor.

3. A method in accordance with claim 2 wherein the spacing between said continuous belt and said conveyor is such as to press said packaging material firmly against said mouth of said container.

4. A method in accordance with claim 1 wherein said heat sealable packaging material is positioned in place against said mouth of said container prior to engagement by a cap fitting over said mouth of said container.

5. A method in accordance with claim 4 wherein said cap is at least partially constructed of a metallic material.

6. A method in accordance with claim 1 wherein said heat sealable packaging material is laminated and has at least one metallic layer.

* * * * *